US006977448B2

(12) United States Patent
Kanouda et al.

(10) Patent No.: US 6,977,448 B2
(45) Date of Patent: Dec. 20, 2005

(54) BACKUP POWER SUPPLY

(75) Inventors: Akihiko Kanouda, Hitachinaka (JP); Satoru Masuyama, Odawara (JP); Masato Isogai, Mito (JP); Ryouhei Saga, Takasaki (JP); Kenichi Onda, Takasaki (JP); Norikazu Tokunaga, Hitachi (JP)

(73) Assignees: Hitachi, Ltd., Tokyo (JP); Hitachi Maxwell, Ltd., Ibaraki (JP); Hitachi Computer Peripherals Co., Ltd., Kanagawa (JP)

( * ) Notice: Subject to any disclaimer, the term of this patent is extended or adjusted under 35 U.S.C. 154(b) by 0 days.

(21) Appl. No.: 10/423,869

(22) Filed: Apr. 28, 2003

(65) Prior Publication Data

US 2003/0184937 A1 Oct. 2, 2003

Related U.S. Application Data

(63) Continuation of application No. 10/083,638, filed on Feb. 27, 2002, now abandoned.

(30) Foreign Application Priority Data

Jun. 6, 2001 (JP) ............................ 2001-171088

(51) Int. Cl.[7] ............................................... H02J 7/00
(52) U.S. Cl. ........................... 307/66; 307/64; 307/52; 307/59
(58) Field of Search ............................. 307/66, 64, 52, 307/59

(56) References Cited

U.S. PATENT DOCUMENTS

| | | | | |
|---|---|---|---|---|
| 5,825,648 | A * | 10/1998 | Karnowski | 700/82 |
| 6,380,715 | B1 * | 4/2002 | Kubo | 320/128 |
| 6,414,403 | B2 * | 7/2002 | Kitagawa et al. | 307/66 |
| 6,455,953 | B1 * | 9/2002 | Lam | 307/23 |
| 2002/0177034 | A1 * | 11/2002 | Kimura et al. | 429/61 |
| 2002/0189906 | A1 * | 12/2002 | Tominaga et al. | 187/290 |

FOREIGN PATENT DOCUMENTS

| | | |
|---|---|---|
| JP | 09-056085 | 2/1997 |
| JP | 09-261955 | 10/1997 |
| JP | 09-322433 | 12/1997 |
| JP | 2000-014043 | 1/2000 |

* cited by examiner

*Primary Examiner*—Robert L. DeBeradinis
(74) *Attorney, Agent, or Firm*—Crowell & Moring LLP

(57) ABSTRACT

Apparatus built-in backup power supply system has a "peak cut" function for sharing a part of the load current at the time of a peak load using a secondary battery. For this purpose, a two-way DC—DC converter 5 and the secondary battery 4 are installed on the DC output side of the AC-DC converter 3, and that portion of the load current that exceeds a predetermined peak cut level is discharged from the secondary battery 4 during peak loading. When the load is less than the predetermined cut level, the secondary battery 4 is charged from the AC-DC converter 3 via the two-way DC—DC converter 5. A suitable peak cut level is determined according to the state of charge of the secondary battery and load pattern, and is changed dynamically.

11 Claims, 8 Drawing Sheets

BACKUP POWER SUPPLY

This application is a continuation of application Ser. No. 10/083,638, filed Feb. 27, 2002 now abandoned.

BACKGROUND OF THE INVENTION

1. Field of the Invention

The present invention relates to a backup power supply arranged in an apparatus.

2. Prior Art

Conventionally, in an apparatus operating under connection to a commercial AC power supply and in a computer suffering damage such as data loss if the commercial AC power supply fails, an uninterruptible power supply (UPS) is installed externally and a countermeasure for service interruption is taken. The UPS externally installed generally uses a fixed inverter power supply system. The fixed inverter power supply system UPS is free of the power supply switching operation at the time of service interruption and high in stability of the power supply. However, there are many series stages of converters through which the current passes during the period from the commercial AC power supply to the load, so that the power conversion efficiency is made lower and realization of power conservation is difficult.

On the other hand, a backup power supply that a secondary battery and a charge-discharge circuit for it are internally loaded and an external UPS is not required is proposed. As an example thereof, "UPS built-in power supply" in Japanese application patent laid-open publication No. Hei 09-322433 may be cited. The constitution of a conventional backup power supply is shown in FIG. 10. A commercial power supply 1 is connected to an AC-DC converter 3 and a charge circuit 8 installed in an information processor 2 and a secondary battery 4 and the input side of a DC—DC converter 7 are connected to the output side of the charge circuit 8. Further, the output side of the DC—DC converter 7 and the output side of the AC-DC converter 3 are connected to each other and connected to a load 6. Further, a balance control circuit 9 is connected between the AC-DC converter 3 and the DC—DC converter 7.

The operation of this circuit is shown in FIG. 11. (a) shows the stationary state and the commercial AC power supply 1 supplies 90% of the power necessary to the load via the AC-DC converter 3. Further, the charge circuit 8 supplies the residual 10% of power to the load via the DC—DC converter 7. Furthermore, the secondary battery 4 is charged via the charge circuit 8. On the other hand, (b) shows the operation during service interruption, and since the commercial power supply 1 fails, the charge circuit 8 and the AC-DC converter cannot operate, though the secondary battery 4 supplies all 100% of power necessary to the load via the DC—DC converter 7.

The aforementioned conventional backup power supply requires three converters such as the AC-DC converter, DC—DC converter, and charge circuit, so that problems arise that the price is high and the volume of the power unit is large.

Further, in this power supply system, the charge circuit operates always in the stationary state and a fixed voltage is applied to the secondary battery. However, when a secondary battery of high energy density such as a Ni-MH secondary battery or a Li ion secondary battery is used, to prevent overcharge, it is necessary to stop the charge circuit when the battery enters the full charge state. However, when the charge circuit is stopped by the aforementioned operation method, a problem arises that the DC—DC converter cannot supply 10% of power. On the other hand, separately from this, a problem of the power supply capacity for load changes is imposed. This problem is that for example, in a load such as a hard disk device, a current 2 or 3 times of the normal load current flows at start and seek time. The rated capacity of the AC-DC converter is designed in accordance with the peak load time, so that the capacity of the AC-DC converter is increased and problems of high cost and difficulty in reduction of the capacity of power unit are imposed.

SUMMARY OF THE INVENTION

An object of the present invention is to solve the aforementioned problems of the prior art and to provide a backup power supply for realizing decrease in cost and reduction in the power unit.

The present invention is a backup power supply built in an apparatus composed of a power supply circuit for converting an alternating current received from a commercial AC power supply to a direct current and a load operated by the current generated by the power supply circuit and the backup power supply is structured so as to have at least one AC-DC converter connected to the commercial alternating current, a load connected to the DC output side of the AC-DC converter, at least one two-way DC—DC converter with one side thereof connected to the DC output side, and a secondary battery connected to the other side of the two-way DC—DC converter.

And, when a load current is larger than a predetermined peak cut current, the differential current between the load current and the predetermined peak cut current is supplied to the load from the secondary battery via the two-way DC—DC converter and the peak cut operation is performed.

Further, when the load current is smaller than the predetermined peak cut current, the load current is supplied from the AC-DC converter and the secondary battery is charged using the two-way DC—DC converter.

The charging current has an upper limit of a predetermined current and only the current equivalent to the differential current between the predetermined peak cut current and the load current is taken in from the two-way DC—DC converter and the secondary battery is charged, so that the commercial input current is stabilized more.

Further, the backup power supply has a detection means for detecting the charging and discharging currents of the secondary battery, a means for detecting the voltage of the secondary battery, and a circuit for calculating the residual capacity of the secondary battery. The predetermined current is changed according to the residual capacity of the secondary battery, and when the residual capacity of the secondary battery reduces lower than a predetermined capacity, the peak cut operation is stopped, and even when the residual capacity reduces less than the predetermined capacity at the time of service interruption or at the time of occurrence of a fault of the AC-DC converter, the discharge operation is performed, thus the operability is improved.

Or, to have a function for calculating and displaying the service interruption holding time at the point of time from the residual capacity of the secondary battery and the load current and to have a function for calculating the residual capacity of the secondary battery necessary to ensure a predetermined service interruption holding time at the point of time from the residual capacity of the secondary battery and the load current and performing the peak cut operation within the range having the calculated residual capacity are effective problem solving means.

Further, the voltage at the connection point of the AC-DC converter and the two-way DC—DC converter is higher than the voltage of the secondary battery and when the two-way DC—DC converter is discharged from the secondary battery side, it may be operated as a booster chopper circuit and when the secondary battery is charged, it may be operated as a voltage reduction chopper circuit.

Further, the DC—DC converter has a means for alternately switching the short-circuit mode for short-circuiting the secondary battery and the inductance by the switching element and the booster mode for ejecting the energy stored in the inductance in the short-circuit mode to the load, a means for detecting the inductance current in the booster mode, and a mean for averaging the inductance current in the booster mode, and only when the result obtained by subtracting a predetermined peak cut current level from the load current is positive, sets the value as a peak cut current command value, compares it with the averaged current mentioned above, and controls the ratio of the short-circuit mode to the booster mode.

Or, the DC—DC converter has a means for detecting the current of the load every a predetermined time and a means for storing the mean value of load currents up to the preceding day, and calculates a mean value of new load currents from the detected load currents and the mean value of load currents up to the preceding day at the same time, stores it in the storage means, and effectively changes the aforementioned predetermined peak cut current from the calculated mean value of new load currents.

In the same way, the DC—DC converter has a means for detecting the current of the load every a predetermined time and a means for storing the mean value of load currents up to the preceding week, and calculates a mean value of new load currents from the detected load currents and the mean value of load currents up to the preceding week at the same time on the same day of the week, stores it in the storage means, changes the aforementioned predetermined peak cut current from the calculated mean value of new load currents, thus a peak cut operation corresponding to the load pattern every week can be performed.

DESCRIPTION OF THE INVENTION

Figure 1:
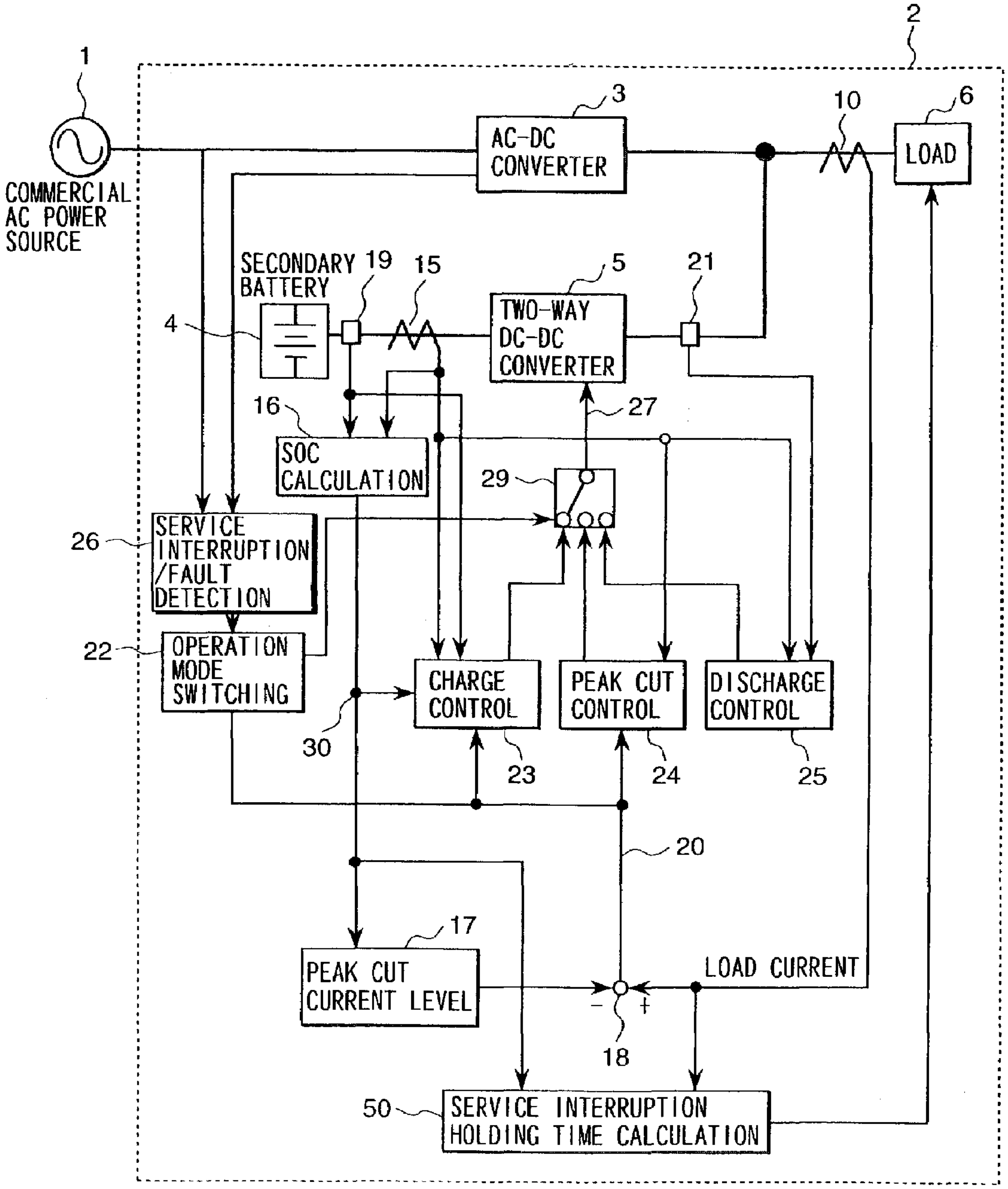
FIG. 1 is a block diagram of the backup power supply with a peak cut function of the first embodiment.

The first embodiment of the present invention will be explained by referring to FIGS. 1 to 8. FIG. 1 is a block diagram showing an embodiment of the present invention. In FIG. 1, an information processor 2 internally has an AC-DC converter 3, a secondary battery 4, a two-way DC—DC converter 5, a load 6, a load current detector 10, a battery current detector 15, an SOC calculation circuit 16, a peak cut current level setting unit 17, a subtracter 18, a battery voltage detection means 19, an output voltage detection means 21, an operation mode switching circuit 22, a charge control circuit 23, a peak cut control circuit 24, a discharge control circuit 25, a service interruption/fault detection circuit 26, and a service interruption holding time calculation circuit 50.

A commercial AC power supply 1 is a commercial AC power supply of 100 V or 200 V and connected to the AC-DC converter 3 and the service interruption/fault detection circuit 26 installed in the information processor 2. A fault signal is input from the AC-DC converter 3 to the service interruption/fault detection circuit 26. The output of the service interruption/fault detection circuit 26 is input to the operation mode switching circuit 22. The output of the AC-DC converter 3 is a direct current at about 48 V and connected to the two-way DC—DC converter 5 and the load 6. The load current detector 10 for detecting the current of the load 6 is connected to the input side of the load. To the load side of the two-way DC—DC converter, the output voltage detection means 21 for detecting an voltage is connected and the output thereof is input to the discharge control circuit 25. The secondary battery 4 is connected to the two-way DC—DC converter 5. When the secondary battery 4 is, for example, a nickel-hydrogen battery having a constitution of serial connection of 15 cells, the terminal voltage of the secondary battery is about 18 V.

Between the secondary battery 4 and the two-way DC—DC converter 5, the battery current detector 15 for detecting the current between them is connected. Further, the battery voltage detection means 19 for detecting the voltage of the secondary battery 4 is connected between them. Both the outputs of the battery current detector 15 and the battery voltage detection means 19 are input to the SOC calculation circuit 16 and the charge control circuit 23 and the output of the battery current detector 15 is input to the peak cut control circuit 24 and the discharge control circuit 25.

A battery SOC 30 which is an output of the SOC calculation circuit 16 is connected to the peak cut current level setting unit 17, the charge control circuit 23, and the service interruption holding time calculation circuit 50. The peak cut current level setting unit 17 is connected to the subtracter 18. Further, the output of the load current detector 10 is input to the subtracter 18 and the service interruption holding time calculation circuit 50. A charge-discharge current command value 20 which is an output of the subtracter 18 is input to the operation mode switching circuit 22, the charge control circuit 23, and the peak cut control circuit 24.

Drive signals which are outputs of the charge control circuit 23, the peak cut control circuit 24, and the discharge control circuit 25 are input to a drive signal switching means 29. Further, the output of the operation mode switching circuit is also input to the drive signal switching means 29. A drive signal 27 which is an output of the drive signal switching means 29 is input to the two-way DC—DC converter 5. The output of the service interruption holding time calculation circuit 50 is output to the load 6.

Figure 2:
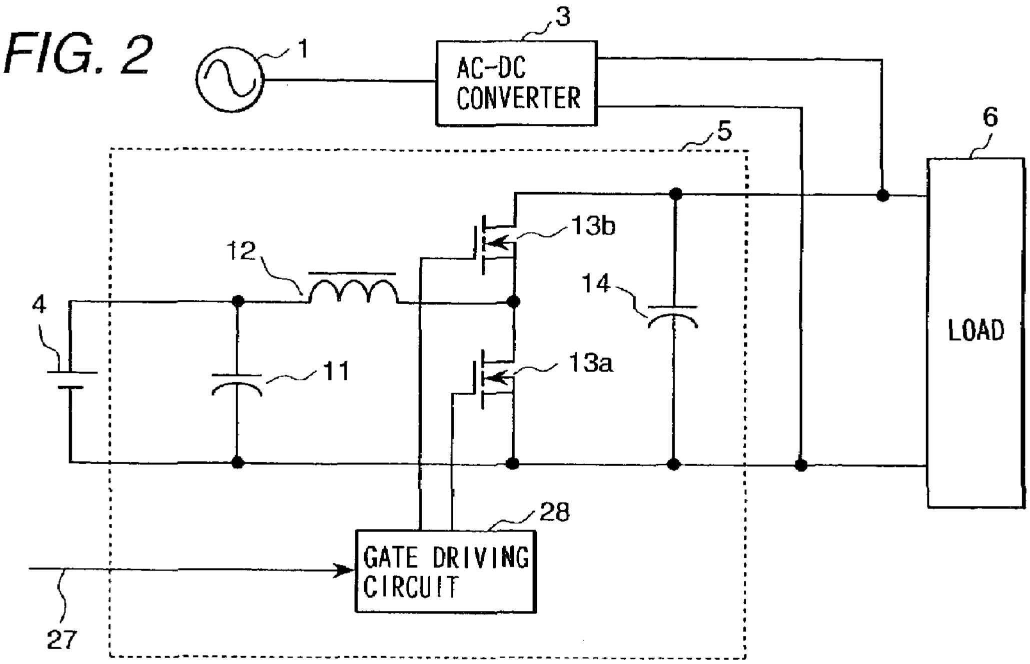
FIG. 2 is a circuit block diagram of the two-way DC—DC converter of the first embodiment.

FIG. 2 shows a constitution diagram of the two-way DC—DC converter 5. In FIG. 2, the same numerals are assigned to the same components as those shown in FIG. 1. Numeral 11 indicates a smoothing condenser, 12 an inductance, 13*a* and 13*b* power MOSFET, 14 a smoothing condenser, and 28 a gate drive circuit.

In FIG. 2, both ends of the secondary battery 4 are connected to the smoothing condenser in the two-way DC—DC converter 5. To the positive pole of the terminals of the smoothing condenser 11, one end of the inductance 12 is connected and the other end of the inductance 12 is connected to the source of the power MOSFET 13*b* and the drain of the power MOSFET 13*a*. The drain of the power MOSFET 13*b* is connected to the positive side of the smoothing condenser 14 and the source of the power MOSFET 13*a* is connected to the negative side of the smoothing condenser 11 and the smoothing condenser 14. The drive signal 27 is input to a gate drive signal. Further, the output of the gate drive circuit 28 is connected to the gates of the power MOSFET 13*a* and the power MOSFET 13*b*. Both ends of the smoothing condenser 14 are connected to the load 6 outside the two-way DC—DC converter 5.

Figure 3:
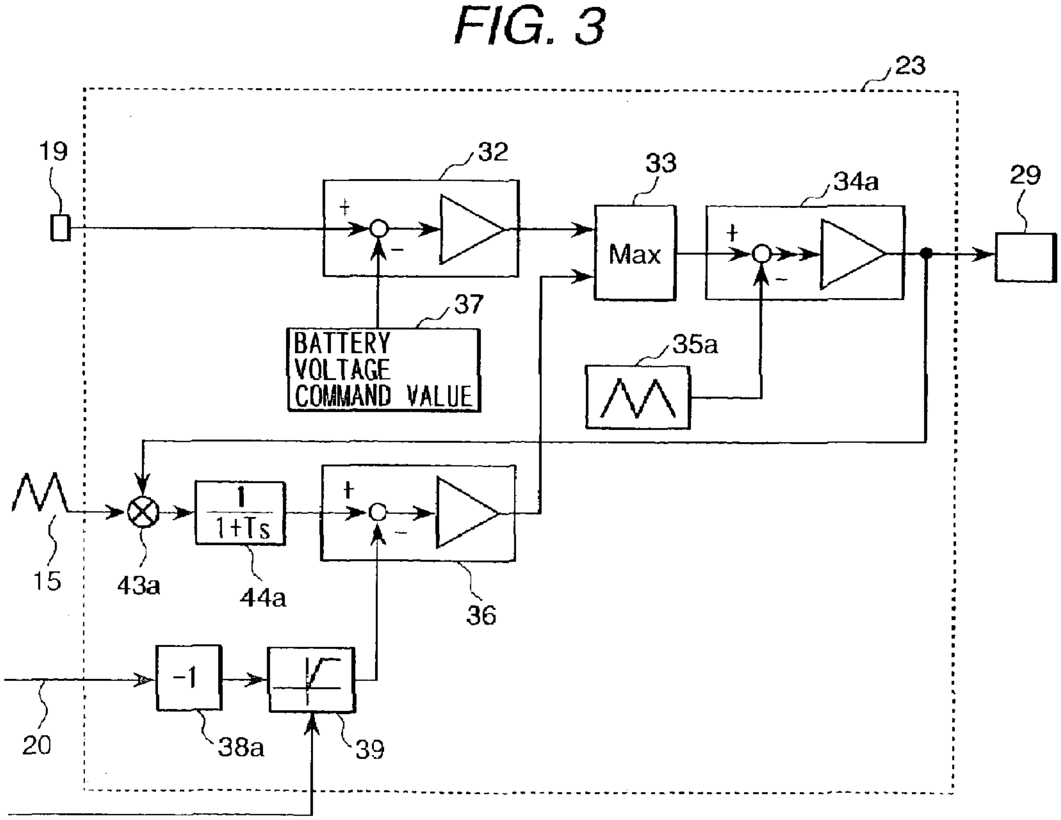
FIG. 3 is a block diagram of the charge control circuit of the first embodiment.

FIG. 3 is a control block diagram showing the inside of the charge control circuit 23 shown in FIG. 1. Numeral 32 indicates a charge voltage control circuit, 33 a maximum output means, 34*a* a PWM comparator, 35*a* a triangular wave generation means, 36 a charging current control circuit, 37 a battery voltage command value, 38*a* a positive-negative inversion means, 39 a variable limiter, 43*a* a multiplier, and 44*a* a time lug of first order element.

The output of the battery voltage detection means 19 is input to the charge voltage control circuit 32 inside the charge control circuit 23. Further, the battery voltage command value 37 is input to the charge voltage control circuit 32. On the other hand, the output of the battery current detector 15 is input to the multiplier 43*a* inside the charge control circuit 23. The output of the multiplier 43*a* is input to the time lug of first order element 44*a*. The output of the time lug of first order element 44*a* is input to the charge current control circuit 36. The charge-discharge current command value 20 is input to the positive-negative inversion means 38*a* inside the charge control circuit 23. The output of the positive-negative inversion means 38*a* is input to the variable limiter 39. The battery SOC 30 is input to the variable limiter 39. The output of the variable limiter 39 is input to the charge current control circuit 36.

The output of the charge voltage control circuit 32 and the output of the charge current control circuit 36 are input to the maximum value output means 33. The output of the maximum value output means 33 is input to the PWM comparator 34*a*. Further, the output of the triangular wave generation means 35*a* is input to the PWM comparator 34*a*. The output of the PWM comparator 34*a* is connected to the drive signal switching means 29 outside the charge control circuit 23 and the multiplier 43*a*.

Figure 4:
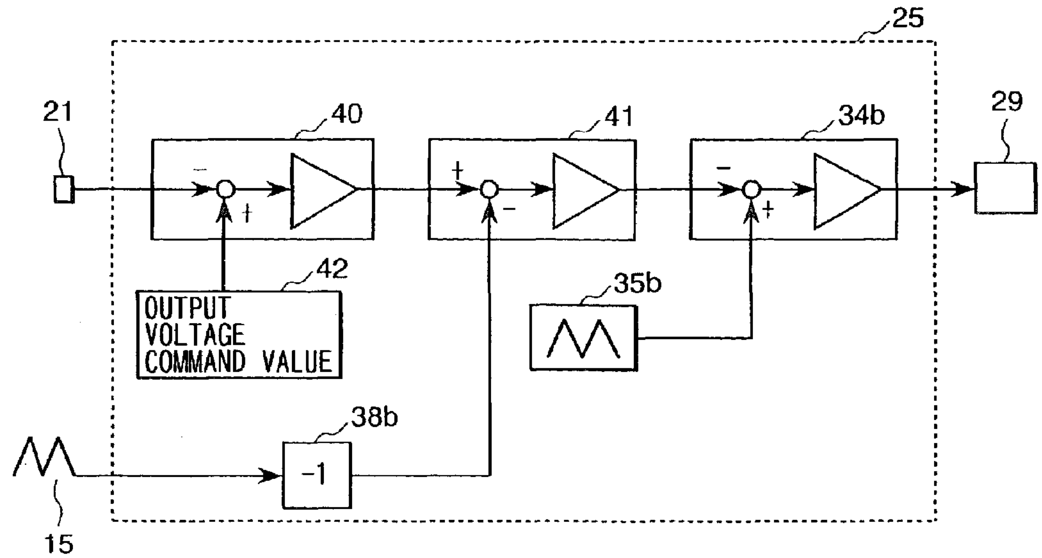
FIG. 4 is a block diagram of the discharge control circuit of the first embodiment.

FIG. 4 is a control block diagram showing the inside of the discharge control circuit 25 shown in FIG. 1. The output of the output voltage detection means 21 is input to the output voltage control circuit 40 inside the discharge control circuit 25. Further, the output of the output voltage command value 42 is also input to the output voltage control circuit 40. The output of the output voltage control circuit 40 is input to the output current control circuit 41. The output of the battery current detector 15 is input to the output current control circuit 41 inside the discharge control circuit 25 via the positive-negative inversion means 38*b*. The output of the output current control circuit 41 is input to the PWM comparator 34*b*. Further, the output of the triangular wave generation means 35*b* is input to the PWM comparator 34*b*. The output of the PWM comparator 34*b* is output to the drive signal switching means 29 outside the discharge control circuit 25.

Figure 5:
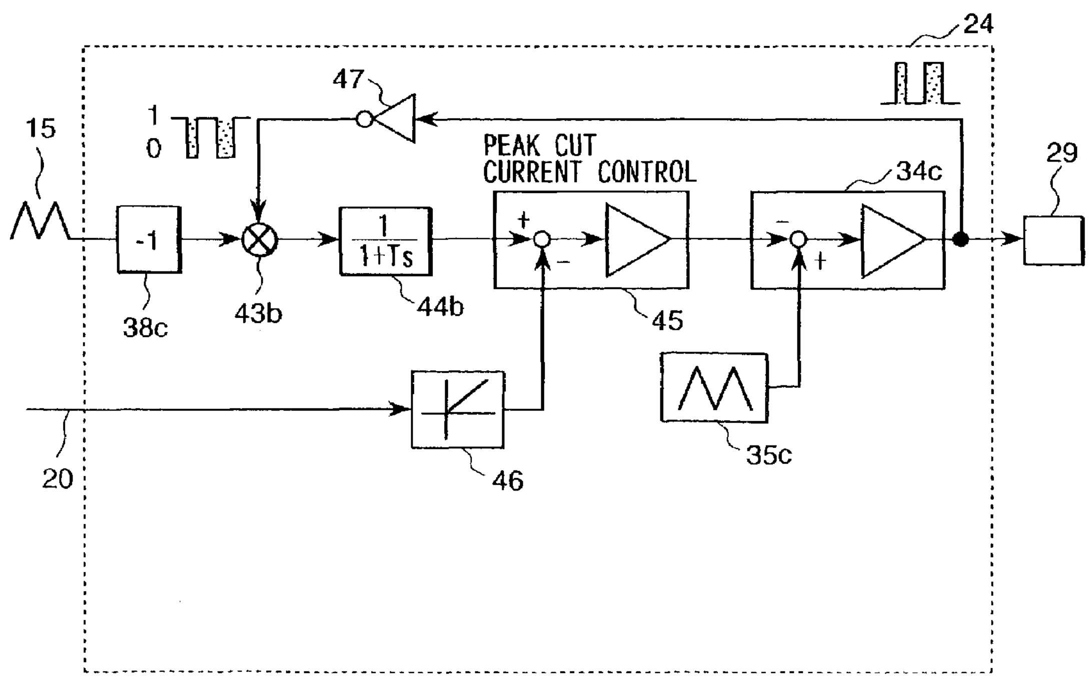
FIG. 5 is a block diagram of the peak cut control circuit of the first embodiment.

FIG. 5 is a control block diagram showing the inside of the peak cut control circuit 24 shown in FIG. 1. In FIG. 5, the same numerals are assigned to the same components as those shown in FIGS. 1, 2, 3, and 4. Numeral 34*c* indicates a PWM comparator, 35*c* a triangular wave generation means, 38*c* a positive-negative inversion means, 43*b* a multiplier, 44*b* a time lag of first order element, 45 a peak cut current control circuit, 46 a limiter, and 47 an inverter.

Next, the connection shown in FIG. 5 will be explained. The output of the battery current detector 15 is input to the positive-negative inversion means 38*c* and the output of the positive-negative inversion means 38*c* is input to the multiplier 43*b*. The output of the multiplier 43*b* is input to the time lag of first order element 44*b* and the output is input to the peak cut current control circuit 45. On the other hand, the charge-discharge current command value 20 is input to the limiter 46. The output of the limiter 46 is input to the peak cut current control circuit 45. The output of the peak cut current control circuit 45 is input to the PWM comparator 34*c*. The output of the triangular wave generation means 35*c* is input to the PWM comparator 34*c*. The output of the PWM comparator 34*c* is output to the inverter 47 and the drive signal switching means 29 outside the peak cut control circuit 24. The output of the inverter 47 is input to the multiplier 43*b*.

Figure 6A:
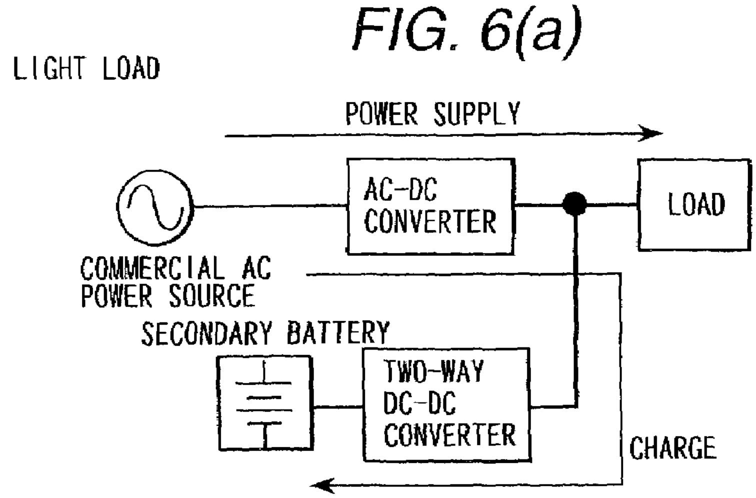
FIG. 6 is a schematic view showing the current path of the first embodiment.
Figure 6B:
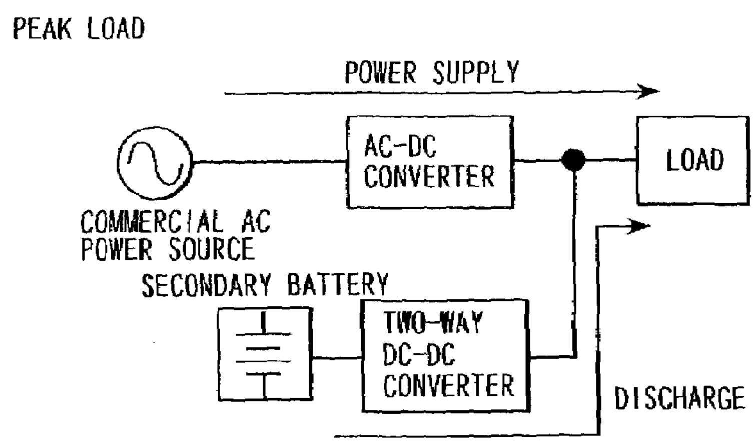
Figure 6C:
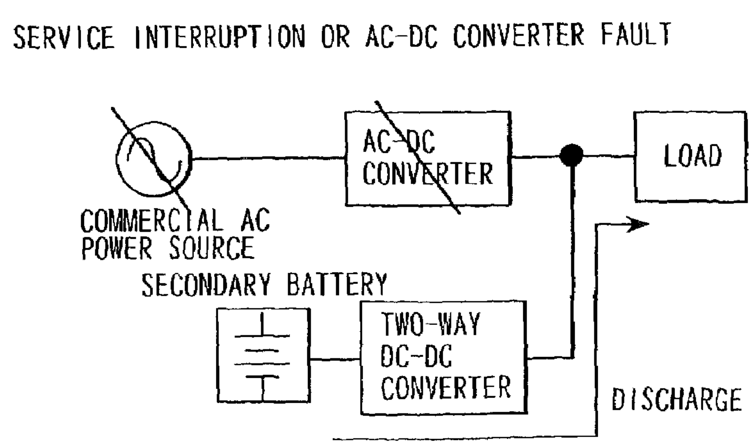

Next, the operation of this embodiment will be explained. When the load 6 is a light load, as shown in FIG. 6(*a*), the secondary battery is charged. In FIG. 1, the commercial AC power supply 1 performs the power supply operation to the load 6 via the AC-DC converter 3 and charges the secondary battery 4 from the load side of the AC-DC converter 3 via the two-way DC—DC converter 5. In this case, the commercial AC power supply 1 and the AC-DC converter 3 are sound, so that the output of the service interruption/fault detection circuit 26 is on the low level and moreover, the load current which is an output of the load current detector 10 is smaller than the output of the peak cut current level setting unit 17, so that the output of the subtracter 18 is a negative value. Therefore, the output of the operation mode switching circuit 22 is "Charge" and the drive signal switching means 29 is switched so as to set the output of the charge control circuit 23 to the drive signal 27.

Next, the operation of the two-way DC—DC converter in the charging stage will be explained. In the charging state, the two-way DC—DC converter turns the power MOSFET 13*b* on or off and controls the time ratio which is a ratio between the on-period and the off-period, thereby controls the current flowing into the secondary battery 4.

In FIG. 2, the voltage of the smoothing condenser 14 is about 48 V because it is an output of the AC-DC converter and the terminal voltage of the secondary battery 4 is about 18 V. Therefore, when the power MOSFET 13*b* is turned on, the current flows in the secondary battery 4 from the power MOSFET 13*b* via the inductance 12 and charges the secondary battery 4. When the power MOSFET 13*b* is turned off, the current flowing in the inductance 12 until then flows back via the body diode of the power MOSFET 13*a*. Then, the time ratio of the power MOSFET 13*b* is controlled, thus the charging current flowing in the secondary battery can be controlled.

Further, at this time, by flowing the current back in the body diode of the power MOSFET 13*a*, the loss in energy is reduced, so that there is a synchronous rectification art available for synchronizing the power MOSFET 13*a* during the body diode current supply period and turning it on and the synchronous rectification can be used also in this embodiment.

In this charging stage, the charging voltage and charging current are controlled by the charge control circuit 23. The voltage of the secondary battery 4 is input to the charge control circuit 23 by the battery voltage detection means 19. In FIG. 3, the secondary battery voltage is compared with the battery voltage command value 37 by the battery voltage control circuit 32 and errors thereof are amplified and output. On the other hand, the charging current flowing from the side of the AC-DC-converter 3 into the two-way DC—DC converter 5 is a current passing the inductance 12 during the period that the power MOSFET 13*b* is on in FIG. 2. Therefore, the charging current detects the current waveform of the inductance 12 by the battery current detector 15, calculates the product of the current and the output signal of the PWM comparator 34*a* during the on-period of the power MOSFET 13*b* by the multiplier 43*a*, and further averages and obtains by the time lag of first order element 44*a*.

This charging current is input to the charging current control circuit 36. The charging current command value is decided as shown below. As shown in FIG. 1, the difference (negative value) between the load current and the peak cut current level is set to a positive value as a charge-discharge current command value 20 via the positive-negative inversion means 38*a* inside the charge control circuit 23 and input to the variable limiter 39.

On the other hand, the voltage of the secondary battery 4 and the charging current are input to the SOC calculation circuit 16 and the residual capacity (SOC) of the secondary battery 4 is calculated. The battery SOC 30 is input to the variable limiter 39 inside the charge control circuit 23. In the variable limiter 39, the maximum value of the charging current command value is changed by the battery SOC 30. With respect to the maximum value, for example, when the SOC is less than 80%, the charging current command value is set to 2C, and when the SOC is from 80% to less than 100%, it is set to 1C, and when the SOC is 100%, it is set to 0. The output of the variable limiter 39 is input to the charging current control circuit 36.

The outputs of the charging current control circuit 36 and the charging voltage control circuit 32 are input to the maximum value output means 33 and the greater one among them is output to the PWM comparator 34*a*. The PWM comparator 34*a* compares the output of the maximum value output means 33 with the output of the triangular wave generation means 35*a* and outputs the PWM signal. The PWM signal is changed to the drive signal 27 by the drive signal switching means 29 and executes PWM control for the two-way DC—DC converter. The charge control of this embodiment charges a charging current equivalent to the difference between the load current and the peak cut level within the range of predetermined charging currents depending on the SOC of the secondary battery.

As mentioned above, in this embodiment, when the residual capacity of the secondary battery is little, so long as it does not exceed the rated capacity of the AC-DC converter, a large current as far as possible is taken in on the two-way DC—DC converter side, thus the secondary battery is rapidly charged and preparations can be made at high speed so as to ensure a sufficient backup time at the time of service interruption.

Next, discharge control at the time of service interruption or at the time of occurrence of a fault of the AC-DC converter will be explained. At the time of occurrence of service interruption, as shown in FIG. 6(*c*), power is supplied to the load from the secondary battery via the two-way DC—DC converter. In FIG. 1, when the service interruption/fault detection circuit 26 detects a service interruption of the commercial AC power supply 1 or a fault of the AC-DC converter 3, the output of the service interruption/fault detection circuit 26 goes high and the operation mode switching circuit 22 switches the operation mode to "Discharge" immediately. In this case, a signal output from the discharge control circuit 25 by the drive signal switching means 29 is selected as a drive signal 27.

Next, the operation of the two-way DC—DC converter 5 in the discharge state shown in FIG. 2 will be explained. In the discharge state, unlike the charge state, the two-way DC—DC converter turns the power MOSFET 13*a* on or off and controls the time ratio which is a ratio between the on-period and the off-period, thereby controls the voltage supplied to the load 6. Assuming the voltage of the secondary battery as about 18 V, it is necessary to output 48 V to be supplied to the load to the smoothing condenser 14.

Then, when the power MOSFET 13*a* is turned on and the secondary battery 4 is short-circuited via the inductance 12, the current flowing in the inductance 12 increases with time. At this time, when the power MOSFET 13*a* is turned off, the current flowing in the inductance 12 is output to the smoothing condenser 14 via the body diode of the power MOSFET 13*b*. Then, when the time ratio of the power MOSFET 13*a* is controlled, the current flowing in the body diode of the power MOSFET 13*b* is controlled and after all, the voltage supplied to the load 6 can be controlled stably.

The operation of the discharge control circuit 25 will be explained by referring to FIG. 4. In FIG. 4, the voltage detected by the output voltage detection means 21 is input to the output voltage control circuit 40 inside the discharge control circuit 25 and compared with the output voltage command value 42 and an error is amplified. This output becomes an output current command value and is input to the output current control circuit 41. On the other hand, the discharging current from the secondary battery which is detected by the battery current detector 15 is inverted in sign by the positive-negative inversion means 38*b* because the charging direction is set positive, input to the output current control circuit 41, and compared with the output current command value and an error is amplified. This output is input to the PWM comparator 34*b* and compared with the triangular wave which is an output of the triangular wave generation means 35*b*. This comparison result becomes a PWM signal, is input to the gate drive circuit 28 shown in FIG. 2 as a drive signal 27, and drives the power MOSFET 13*a* and 13*b*. By doing this, the two-way DC—DC converter 5 is controlled so as to make the voltage of the smoothing condenser 14 equal to the output voltage command value. As stated in above, since the charge and the discharge are controlled, a function as USP can be satisfied.

Next, peak cut control will be explained. At the time of peak load, as shown in FIG. 6(*b*), the operation of power supply to the load from the AC-DC converter and the two-way DC—DC converter is performed. Namely, the two-way DC—DC converter 5 connected as shown in FIG. 1 alternately switches the short-circuit mode for short-circuiting the secondary battery 4 and the inductance 12 by the switching element and the booster mode for ejecting the energy stored in the inductance 12 in the short-circuit mode to the load 6. Further, the converter 5 has a means for detecting the inductance current in the booster mode and a mean for averaging the inductance current in the booster mode, and only when the result obtained by subtracting a predetermined peak cut current level from the load current is positive, sets the value as a peak cut current command value, compares it with the averaged current, and controls the ratio of the short-circuit mode to the booster mode. Hereunder, the aforementioned will be explained concretely.

In FIG. 1, when a load current exceeding the current of the peak cut current level setting unit 17 flows, the output of the service interruption/fault detection circuit 26 goes low and the output of the subtracter 18 becomes a positive value, so that the output of the operation mode switching circuit 22 is set to "Peak cut operation" and the drive signal switching means 29 is switched so that the output signal form the peak cut control circuit 24 is selected as a drive signal 27.

In FIG. 5, the discharging current detected by the battery current detector 15 is inverted in sign by the positive-negative inversion means 38*b* because the charging direction is set positive and input to the multiplier 43*b*. The output pulse signal of the PWM comparator 34*c* is inverted by the inverter 47 and a digital signal of 0 or 1 is input to the other side of the multiplier 43*b*. As a result, when the output of the PWM comparator 34*c* is high, the power MOSFET 13*a* shown in FIG. 2 is ON and the output of the multiplier 43*b* becomes 0. On the other hand, when the output of the PWM comparator 34*c* is low, the power MOSFET 13*a* is OFF and the output of the multiplier 43*b* becomes an input of the inverter 38*c*.

Therefore, by the multiplier 43*b*, among the currents flowing in the inductance 12, the current in the short-circuit mode which is the on-period of the power MOSFET 13*a* is removed and only the current in the booster mode which passes the body diode of the power MOSFWT 13*b* is output. The booster mode current is averaged by the time lag of first order element 44*b* and input to the peak cut current control circuit 45.

The charge-discharge current command value 20 is the difference between the load current and the peak cut level, which is a discharging current command value in this case. This command value is restricted by the limiter 46 for cutting the negative side, so that only when the load current is larger than the peak cut current level, it passes the limiter 46 and is input to the peak cut current control circuit 45. The output of the peak cut current control circuit 45 is input to the PWM comparator 34*c* and compared with the triangular wave which is an output of the triangular wave generation means 35*c* and the PWM signal is input to the two-way DC—DC converter 5 via the drive signal switching means 29.

Under the peak cut control, the differential current between the load current and the peak cut current level is output from the two-way DC—DC converter by the control system mentioned above. As a result, the output current from the AC-DC converter is constant on the peak cut current level.

Figure 7:
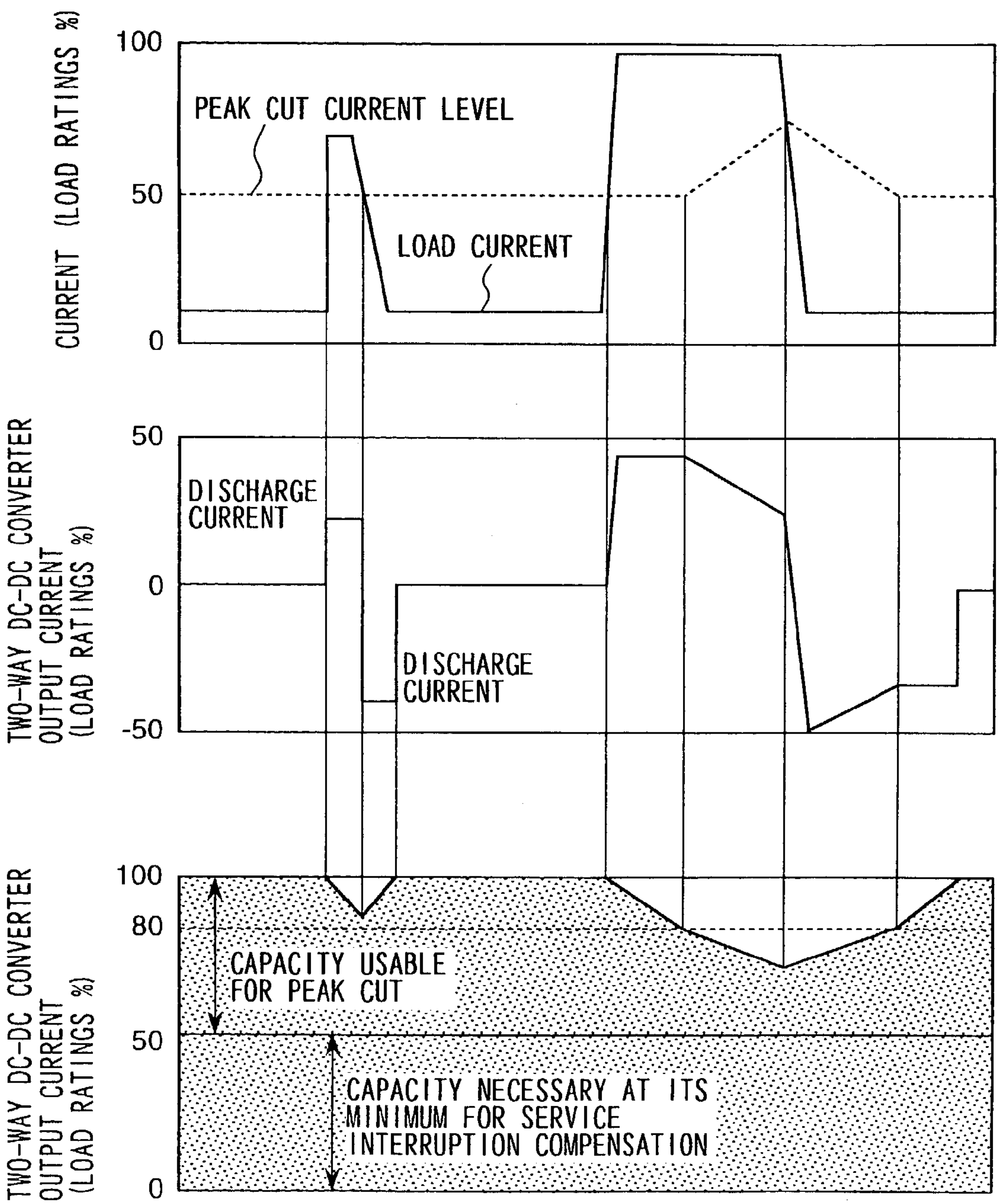
FIG. 7 is an illustration showing the relation between the load current, the output current of the two-way DC—DC converter, and the SOC of the secondary battery of the first embodiment.

In FIG. 7, the aforementioned waveforms of each unit under the peak cut control and at the time of charge are shown. When the load current is higher than the peak cut current level, a discharging current is output from the two-way DC—DC converter 5 and the difference is corrected. When the load current becomes lower than the peak cut current level thereafter, the SOC of the secondary battery is lowered due to discharge, so that the charging operation is performed. Further, when the SOC of the secondary battery becomes lower than 80% which is a preset value, the peak cut level is changed and the peak cut correction amount is reduced. Further, the peak cut control is executed within the range of the SOC of the secondary battery from 100% to 50% and for service interruption correction, 50% or more of the SOC of the secondary battery is always charged.

Figure 8:
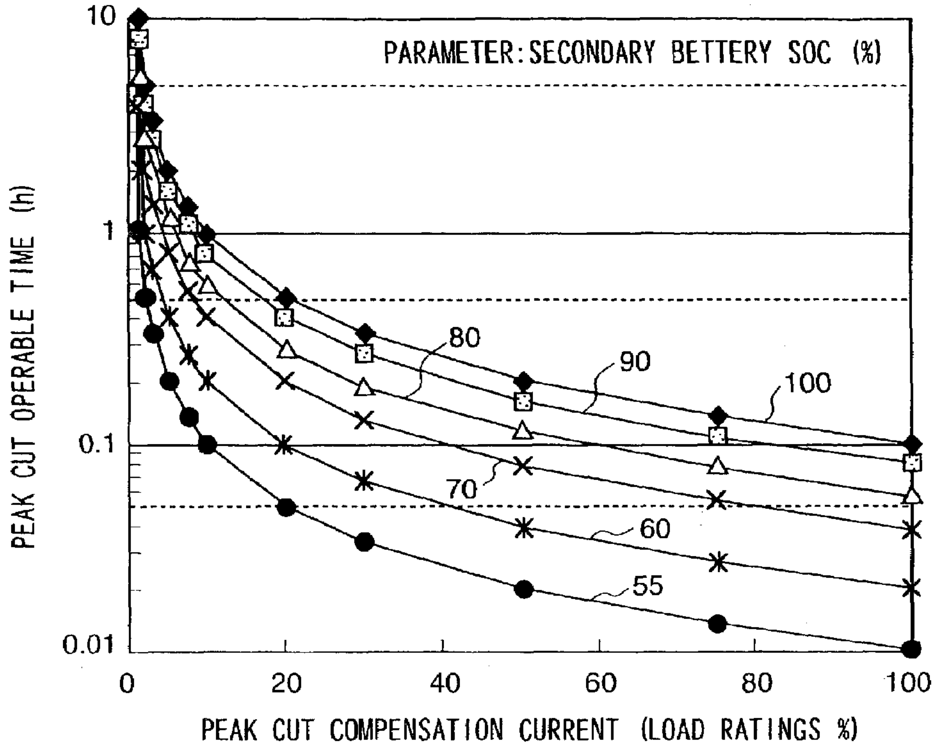
FIG. 8 is a graph showing the relation between the peak cut correction current and the peak cut operable time of the first embodiment.
Figure 10:
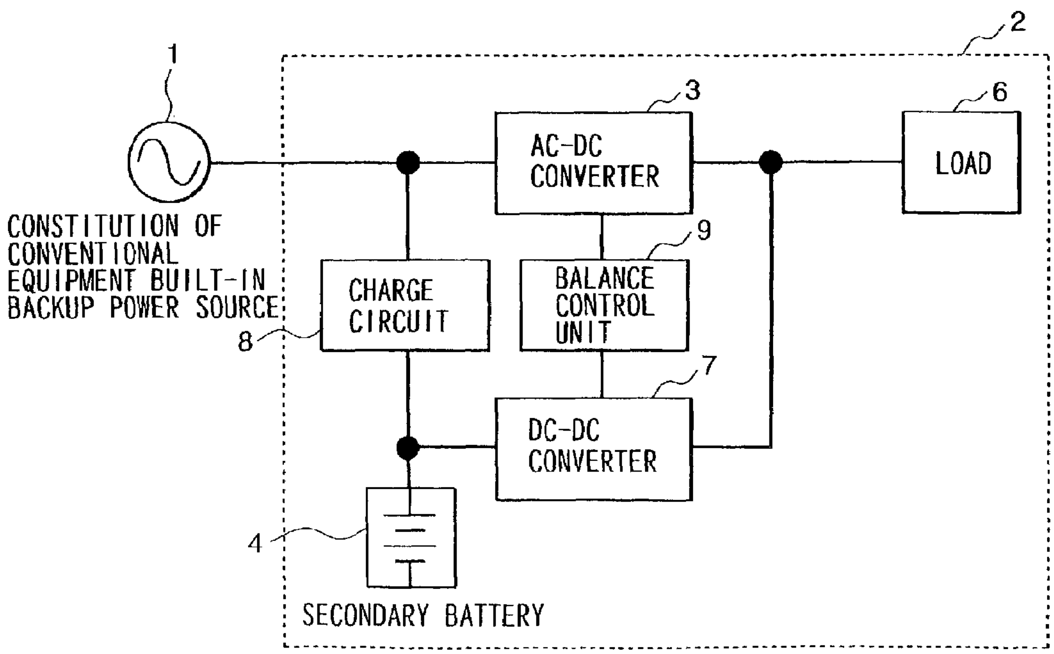
FIG. 10 is a schematic view of a conventional apparatus built-in backup power supply.

FIG. 8 shows, as an example, the relation between the peak cut correction current and the peak cut operable time. For the secondary battery, the rated load can be corrected for six minutes during service interruption at an SOC of 50%. A parameter is the SOC of the secondary battery at start of the peak cut operation. The peak cut correction current on the transverse axis is an amount derived from standardizing the current output from the secondary battery via the two-way DC—DC converter by the rated current. As a result, assuming the peak cut correction current as 20% when the SOC is 100%, the rated load can be corrected continuously for 0.5 hours, while when the SOC is 55%, the rated load can be corrected continuously only for 0.05 hours.

Therefore, in this embodiment, the peak cut level is changed depending on the SOC of the secondary battery, and the service interruption correction capacity necessary at its minimum is always kept, and the most suitable peak cut value is dynamically changed, thus the operation is performed.

Next, the operation of the service interruption holding time calculation circuit 50 shown in FIG. 1 will be explained. The service interruption holding time calculation circuit 50 reads the battery SOC 30 and load current and calculates the service interruption holding time. The battery SOC 30 outputs the calculation results to the load 6. By doing this, on the CRT included in the load 6 or an liquid crystal monitor, the service interruption holding time can be displayed. Since the service interruption holding time can be displayed, the use condition of the battery can be recognized always, so that an operation method using a constant peak cut current level can be realized easily.

Further, in this embodiment, the drawing shows a state that the AC-DC converter 3, the two-way DC—DC converter 5, and the secondary battery 4 are used one each respectively or as a one system. To eliminate damage to the load at the time of a fault of the converters, the embodiment can correspond also to a power supply for an n+1 unit parallel redundant constitution constituting a redundant system as parallel connection of a plurality of units of the AC-DC converter 3. In this case, a plurality of units of an integrated unit of the two-way DC—DC converter and the secondary battery are connected in parallel, thus the reliability at the time of occurrence of a fault, maintenance and inspection, or exchange of the two-way DC—DC converter or the secondary battery can be enhanced. Or, a constitution that a plurality of only two-way DC—DC converters are connected in parallel and a one system of secondary battery is used or a constitution that a plurality of systems of secondary batteries and one two-way DC—DC converter are used is also available.

Figure 9:
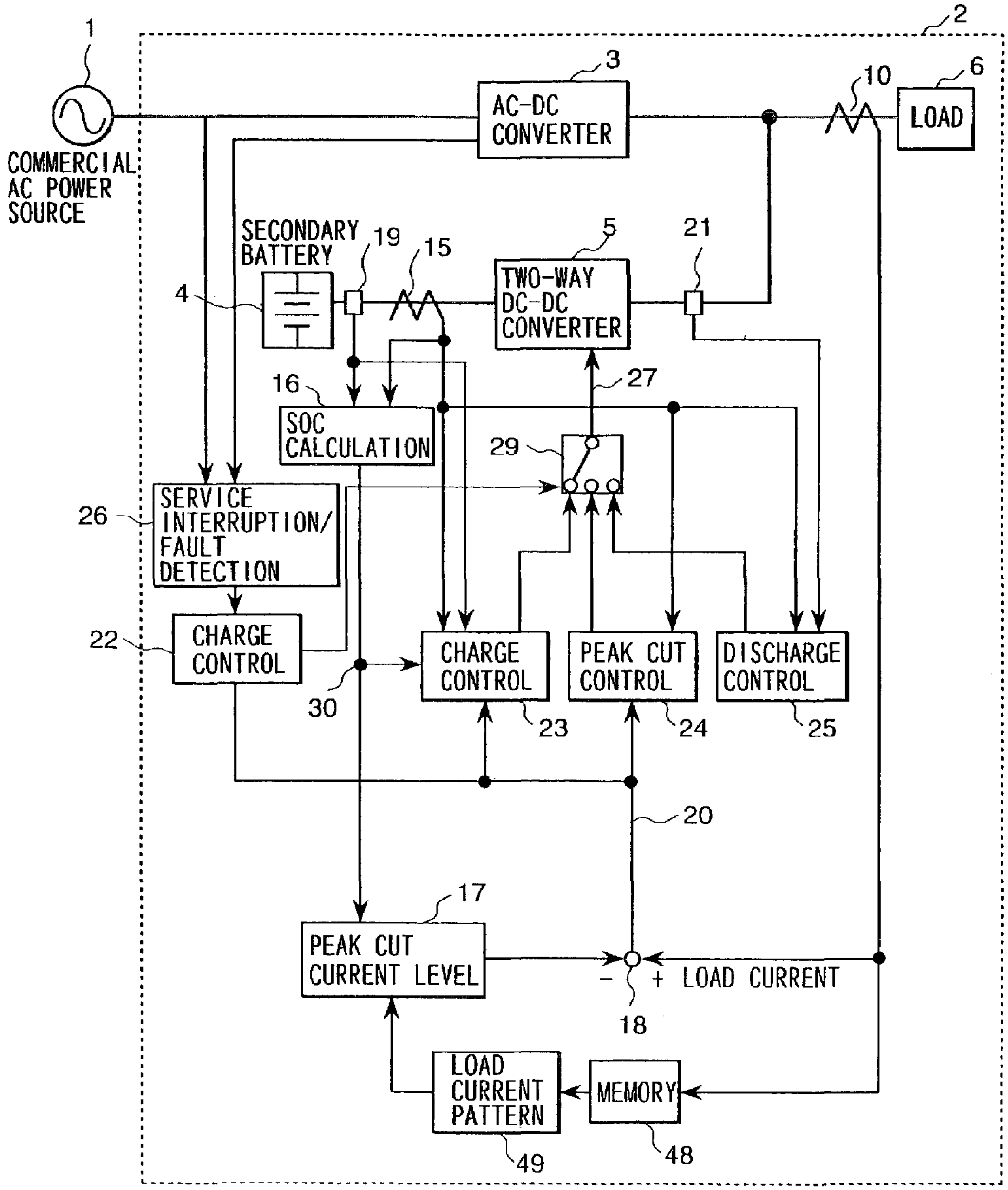
FIG. 9 is a block diagram of the backup power supply with a peak cut function of the second embodiment.
Figure 11A:
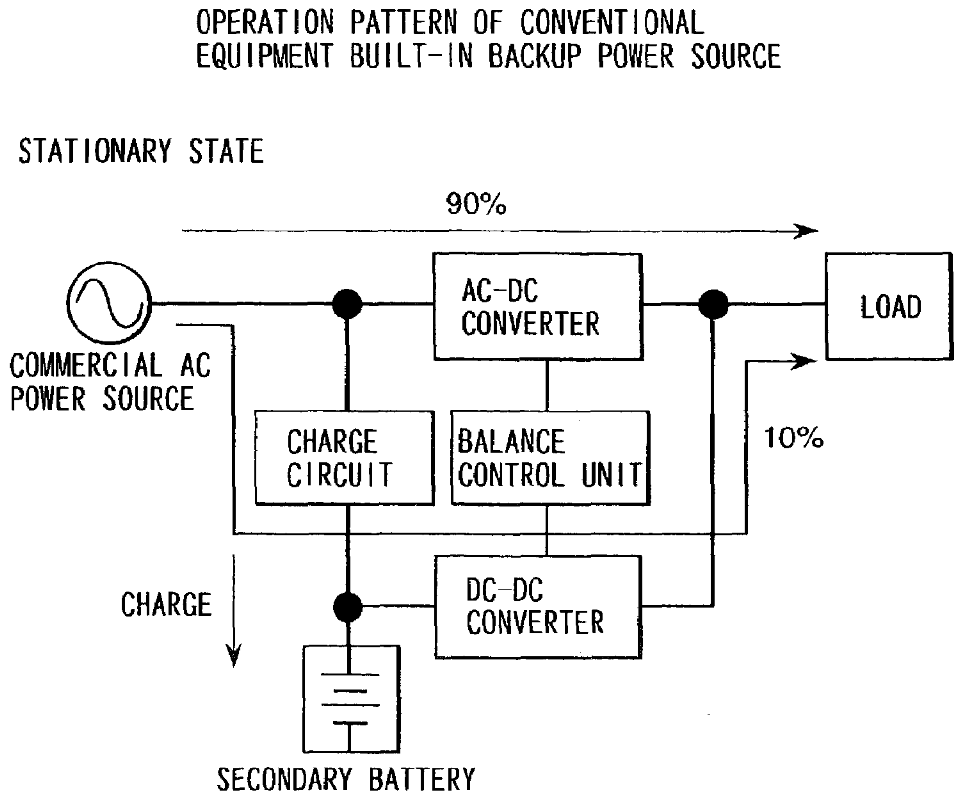
FIG. 11 is a schematic view showing the operation configuration of a conventional apparatus built-in backup power supply.
Figure 11B:
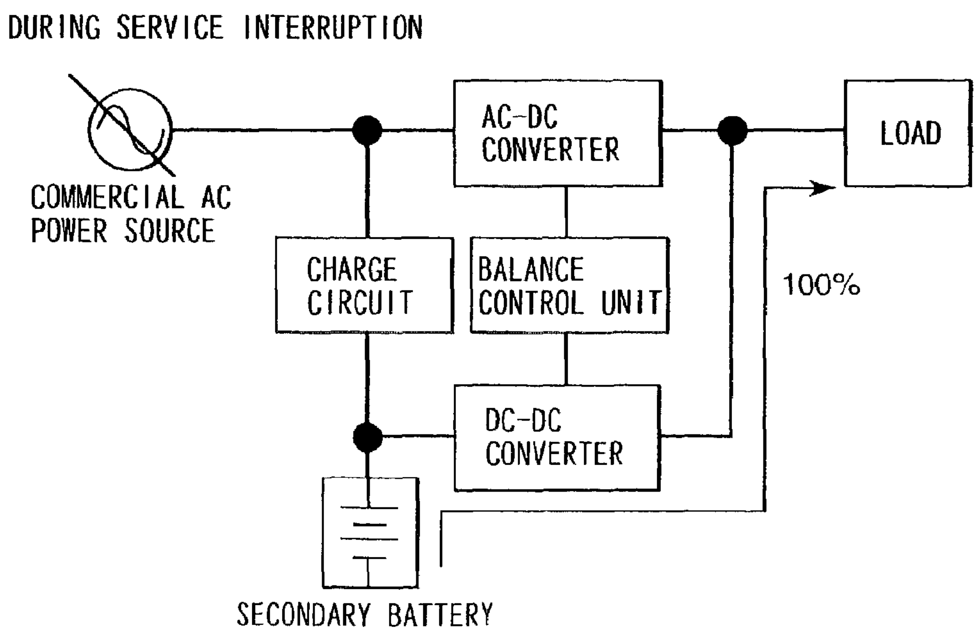

Next, the second embodiment of the present invention will be explained. In FIG. 9, the same numerals are assigned to the same components as those shown in FIG. 1. Additionally, a memory 48 and a load current pattern setting unit 49 are provided. The connection configuration of the components other than the aforementioned shown in FIG. 9 is the same as that shown in FIG. 1. The memory 48 is connected to the load current detector 10 and the load current pattern setting unit 49 is connected to the memory 48. The output of the load current pattern setting unit 49 is input to the peak cut current level setting unit 17.

Next, the operation will be explained. The variation of the load current is detected by the load current detector 10 and recorded in the memory 48. For example, one day is divided every a fixed period such as every one minute or one second and load currents are sampled and stored at a predetermined address of the memory 48 as mean value data thereof. At the same time on the next day, a mean value of the mean value data of load currents at the same time up to the preceding day and the present load current is calculated newly and the mean value data is rewritten. In this way, the mean value of daily load currents in each region is stored. Or, a memory of one week is prepared and the mean value of similar load currents at the same time on the same day of the week may be stored. As a result, by the load current pattern setting unit 49, an average load current pattern in a one-day period or one-week period of the load 6 is automatically prepared.

In this embodiment, this load current pattern is reflected on the peak cut current level. Namely, in the period that a comparatively large load current is continuous, the peak cut current level is set comparatively high, thus the discharge rate from the secondary battery can be suppressed. Or, on the basis of the capacity of the secondary battery, a most suitable peak cut current level can be set every time from the aforementioned load current pattern.

By use of the constitution of this embodiment, for example, many kinds of backup power supplies having different load capacities can be structured by the same hardware and the manufacturing cost can be reduced. Further, a most suitable peak cut level according to the load can be automatically set and manual initial setting is not necessary, so that when a user only connects the backup power supply of the present invention, the peak cut operation is functioned, thus the operability is improved.

According to the present invention, the peak cut operation discharged from the secondary battery at the time of peak load is executed, thus the capacity of the AC-DC converter is reduced and low price and reduction in the capacity of the power unit can be realized. Further, overcharge can be prevented. Furthermore, the peak cut level of the present invention can be made changeable as a set value, thus the same hardware can be used for a different load and the manufacturing cost can be reduced. Further, by display of the service interruption holding time, even in an operation configuration having a constant peak cut amount, the reliability is enhanced.

What is claimed is:

1. A backup power supply built in a device constituted by a power supply circuit for converting an alternating current (AC) received from a commercial AC power supply to a direct current (DC), and a load operated by said direct current (DC) generated by said power supply circuit, the backup power supply comprising:

at least one AC-DC converter connectable to said commercial alternating current (AC);

a load connected to a DC output side of said AC-DC converter;

at least one two-way DC—DC converter in which one side of said two-way DC—DC converter is connected to said DC output side;

a Ni-MH secondary battery or a Li ion secondary battery connected to another side of said two-way DC—DC converter;

detecting means for detecting a service interruption of the AC power supply or a failure of said AC-DC converter;

means operable during occurrence of a detected service interruption or failure, for discharging electric power from said secondary battery, to supply said load;

charge state determining means for determining a state of charge of said secondary battery;

battery current detecting means for detecting battery current of said secondary battery; and control means for altering and controlling a charging current which flows to said secondary battery, according to the state of charge determined by the charge state determining means, based on the battery current detected by said battery current detecting means.

2. The backup power supply according to claim 1, wherein said control means comprises:

means for changing between a charging mode for charging said Ni-MH secondary battery or said Li ion secondary battery, and a discharging mode for discharging said Ni-MH secondary battery or said Li ion secondary battery;

separate charging and discharging controlling circuits; and means for switching among driving signals output by the charging controlling circuit and the discharging controlling circuits.

3. In a backup power supply having a peak cut function and built in a device constituted by a power supply circuit for converting an alternating current (AC) received from a commercial AC power supply to a direct current (DC) and a load operated by said direct current (DC) generated by said power supply circuit, the backup power supply having the peak cut function and comprising:

at least one AC-DC converter connectable to said commercial AC power supply;

a load connected to a DC output side of said AC-DC converter;

at least one two-way DC—DC converter in which one side of said two-way DC—DC converter thereof is connected to said DC output side; and a secondary battery connected to another side of said two-way DC—DC converter;

wherein when a load current is a predetermined peak cut current value or larger, said backup power supply supplies a difference current between said load current and said predetermined peak cut current value to said load via said two-way DC—DC converter, and said backup power supply carries out a peak cut operation;

wherein when said load current is smaller than said predetermined peak cut current value, said backup power supply supplies said load current from said AC-DC converter and charges said secondary battery via said two-way DC—DC converter; and wherein the peak cut current value is varied according to residual capacity of the secondary battery.

4. A backup power supply according to claim 3, wherein from a residual capacity of said secondary battery and said load current, said backup power supply has a function for calculating and displaying a service interruption time at said point of time.

5. In a device for supplying a DC current to operate a load, a backup power supply system comprising:

at least one AC-DC converter connectable to a commercial AC power supply, for converting AC current received from said commercial AC power supply to DC current at a DC output side of said at least one AC-DC converter;

a load connected to said DC output side of said AC-DC converter;

at least one two-way DC—DC converter having first and second input/output sides, one of which input/output sides is connected to said DC output side of the AC-DC converter;

a Ni-MH secondary battery or a Li ion secondary battery connected to the other of said first and second input/output sides of said two-way DC—DC converter;

detecting means for detecting a service interruption of the AC power supply or a failure of said AC-DC converter;

means operable during occurrence of a detected service interruption or failure, for discharging electric power from said secondary battery, to supply said load;

charge state determining means for determining a state of charge of said secondary battery;

battery current detecting means for detecting battery current of said secondary battery; and control means for altering and controlling a charging current which flows to said secondary battery, according to the state of charge determined by the charge state determining means, based on the battery current detected by said battery current detecting means.

6. The backup power supply according to claim 5, wherein said control means comprises:

means for changing between a charging mode for charging said Ni-MH secondary battery or said Li ion secondary battery, and a discharging mode for discharging said Ni-MH secondary battery or said Li ion secondary battery, separate charging and discharging controlling circuits; and means for switching among driving signals output by the charging controlling circuit and the discharging controlling circuits.

7. In a device for supplying DC current to operate a load, a backup power supply system having a peak cut function, said backup power supply system comprising:

at least one AC-DC converters connectable to a commercial AC power supply, for converting AC current received from said commercial AC power supply to DC current at a DC output side of said at least one AC-DC converter;

a load connected to said DC output side of said AC-DC converter;

at least one two-way DC—DC converter having first and second input/output sides, one of which input/output sides is connected to said DC output side of the AC-DC converter; and a secondary battery connected to the other of said first and second input sides of said two-way DC—DC converter;

wherein when a load current equals or exceeds a predetermined peak cut current value, said backup power supply system supplies a current having a magnitude equal to a difference between said load current and said predetermined peak cut current value to said load via said two-way DC—DC converter, and said backup power supply system carries out a peak cut operation;

wherein when said load current is smaller than said predetermined peak cut current value, said backup power supply supplies said load current from said AC-DC converter and charges said secondary battery via said two-way DC—DC converter; and wherein the peak cut current value is varied according to residual capacity of the secondary battery.

8. A backup power supply according to claim 7, wherein from a residual capacity of said secondary battery and said load current, said back up power supply has a function for calculating and displaying a service interruption time at said point of time.

9. A backup power supply built in a device constituted by a power supply circuit for converting an alternating current (AC) received from a commercial AC power supply to a direct current (DC), and a load operated by said direct current (DC) generated by said power supply circuit, the backup power supply comprising:

at least one AC-DC converter connectable to said commercial alternating current (AC);

a load connected to a DC output side of said AC-DC converter;

at least one two-way DC—DC converter in which one side of said two-way DC—DC converter is connected to said DC output side;

a Ni-MH secondary battery or a Li ion secondary battery connected to another side of said two-way DC—DC converter; and detecting means for detecting a service interruption of the AC power supply or a failure of said AC-DC converter;

means operable during occurrence of a detected service interruption or failure, for discharging electric power from said secondary battery, to supply said load;

charge state determining means for determining a state of charge of said secondary battery;

battery current detecting means for detecting battery current of said secondary battery; and control means for altering and controlling a charging current which flows to said secondary battery, according to the state of charge determined by the charge state determining means, based on the battery current detected by said battery current detecting means; and from a residual capacity of said secondary battery and said load current, said back up power supply has a function for calculating and displaying a service interruption time at said point of time.

10. In a device for supplying a DC current to operate a load, a backup power supply system comprising:

at least one AC-DC converter, connectable to a commercial AC power supply, for converting AC current received from said commercial AC power supply to DC current at a DC output side of said at least one AC-DC converter;

a load connected to said DC output side of said AC-DC converter;

at least one two-way DC—DC converter having first and second input/output sides, one of which input/output sides is connected to said DC output side of the AC-DC converter;

a Ni-MH secondary battery or a Li ion secondary battery connected to the other of said first and second input/output sides of said two-way DC—DC converter;

detecting means for detecting a service interruption of the AC power supply or a failure of said AC-DC converter;

means operable during occurrence of a detected service interruption or failure, for discharging electric power from said secondary battery, to supply said load;

charge state determining means for determining a state of charge of said secondary battery;

battery current detecting means for detecting battery current of said secondary battery; and control means for altering and controlling a charging current which flows to said secondary battery, according to the state of charge determined by the charge state determining means, based on the battery current detected by said battery current detecting means;

wherein from a residual capacity of said secondary battery and said load current, said back up power supply has a function for calculating and displaying a service interruption time at said point of time.

11. A backup power supply comprising:

a two-way DC/DC converter in which one end thereof is connected to a DC output power of an AC/DC converter and another end thereof is connected to a secondary battery, the DC output power of the AC/DC converter being carried out with a down-convert during charging of the secondary battery and output power of the secondary battery being carried out with an up-convert while the secondary battery is discharging and supplied to a load;

means for detecting AC service interruption and for detecting a fault of the AC/DC converter; and means for transmitting a signal having a state which changes according to occurrence of the service interruption to the load.

* * * * *